(12) United States Patent
Altman et al.

(10) Patent No.: US 7,735,007 B2
(45) Date of Patent: * Jun. 8, 2010

(54) ADDING AND REMOVING WHITE SPACE FROM A DOCUMENT

(75) Inventors: Dan Altman, Kirkland, WA (US); Eric Fox, Seattle, WA (US); Steve Weil, Bellevue, WA (US); Marieke Iwema, Seattle, WA (US); Charlton E Lui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1025 days.

This patent is subject to a terminal disclaimer.

(21) Appl. No.: 11/332,285

(22) Filed: Jan. 17, 2006

(65) Prior Publication Data
US 2006/0117254 A1    Jun. 1, 2006

Related U.S. Application Data

(63) Continuation of application No. 10/141,772, filed on May 10, 2002, now Pat. No. 7,028,256.

(51) Int. Cl.
  *G06F 17/00* (2006.01)
(52) U.S. Cl. .................................. 715/244; 715/268
(58) Field of Classification Search ............... 715/244, 715/243, 245, 268, 247, 246, 251, 252, 253, 715/273
See application file for complete search history.

(56) References Cited

U.S. PATENT DOCUMENTS

| | | | |
|---|---|---|---|
| 4,395,031 A | * | 7/1983 | Gruber et al. ............ 270/52.29 |
| 4,686,649 A | * | 8/1987 | Rush et al. ................... 715/234 |
| 4,709,348 A | | 11/1987 | Horn et al. |
| 5,220,649 A | | 6/1993 | Forcier |
| 5,231,698 A | | 7/1993 | Forcier |
| 5,428,805 A | | 6/1995 | Morgan |
| 5,502,803 A | | 3/1996 | Yoshida et al. |

(Continued)

OTHER PUBLICATIONS

Commonly assigned U.S. Appl. No. 10/158,211, filed May 31, 2002.

(Continued)

*Primary Examiner*—Laurie Ries
(74) *Attorney, Agent, or Firm*—Woodcock Washburn LLP

(57) ABSTRACT

A method, a computer system and a computer-readable medium having instructions for a processor stored thereon are provided for growing a page on a display. Input indicating a first position or designation of content on a page of an electronic document and an amount of white space to be inserted in the page is received. Responsive to the received input, at least some of the content of the page of the electronic document is moved to insert white space. The moving starts from a point based on the first position. The portion of the content being moved is moved a distance based on the amount of white space indicated in the received input. The page is grown by an amount based on the amount of the white space indicated in the received input. A respective size of other pages of the electronic document remains unchanged. Also provided are a method, a computer system and a computer-readable medium having instructions for a processor stored thereon for deleting a portion of a page and reducing a size of the page.

20 Claims, 16 Drawing Sheets

U.S. PATENT DOCUMENTS

| | | | |
|---|---|---|---|
| 5,517,578 | A | 5/1996 | Altman et al. |
| 5,553,217 | A | 9/1996 | Hart et al. |
| 5,590,257 | A | 12/1996 | Forcier |
| 5,613,019 | A | 3/1997 | Altman et al. |
| 5,623,679 | A | 4/1997 | Rivette et al. |
| 5,666,139 | A | 9/1997 | Thielens et al. |
| 5,778,404 | A | 7/1998 | Capps et al. |
| 5,838,321 | A | 11/1998 | Wolf |
| 5,953,735 | A | 9/1999 | Forcier |
| 5,956,423 | A | 9/1999 | Frink et al. |
| 6,105,044 | A | 8/2000 | Derose et al. |
| 6,128,633 | A | 10/2000 | Michelman et al. |
| 6,163,784 | A | 12/2000 | Taguchi |
| 6,326,970 | B1 | 12/2001 | Mott et al. |
| 6,340,967 | B1 | 1/2002 | Maxted |
| 6,408,092 | B1 | 6/2002 | Sites |
| 6,437,807 | B1 | 8/2002 | Berquist et al. |
| 6,473,102 | B1 | 10/2002 | Rodden et al. |
| 6,525,749 | B1 | 2/2003 | Moran et al. |
| 6,683,631 | B2 | 1/2004 | Carroll |
| 6,694,485 | B1 | 2/2004 | Kelley et al. |
| 6,752,317 | B2 | 6/2004 | Dymetman et al. |
| 6,820,237 | B1 | 11/2004 | Abu-Hakima et al. |
| 6,829,372 | B2 | 12/2004 | Fujioka |
| 7,028,256 | B2 | 4/2006 | Altman et al. |
| 2001/0045884 | A1* | 11/2001 | Barrus et al. ............. 340/7.2 |
| 2002/0059350 | A1 | 5/2002 | Iwema et al. |
| 2002/0069296 | A1 | 6/2002 | Aua et al. |
| 2002/0097270 | A1 | 7/2002 | Keely et al. |
| 2002/0152240 | A1 | 10/2002 | Kitainik et al. |
| 2003/0001899 | A1 | 1/2003 | Partanen et al. |
| 2003/0023631 | A1 | 1/2003 | Castle |
| 2003/0212958 | A1 | 11/2003 | Altman et al. |
| 2003/0226113 | A1 | 12/2003 | Altman et al. |
| 2004/0032415 | A1 | 2/2004 | Rimas et al. |
| 2005/0005246 | A1 | 1/2005 | Card et al. |
| 2005/0120302 | A1 | 6/2005 | Altman et al. |
| 2006/0123336 | A1 | 6/2006 | Altman et al. |

OTHER PUBLICATIONS

Aha! InkWriter, the Simplicity of pen and paper, the power of word processing, Advetisement, 1983, 2pp., aha! software corporation, Mountain View, CA.

Aha! InkWriter for Magic Cap "The fastest, most convenient way to create faxes, notes and messages." Advertisement, 1993, 1994, 2 pp., aha! software corporation, Mountain View, CA.

Aha! 2.0 for Windows InkWriter The power of word processing, the convenience of pen and paper, Advertisement, 1994, 1995, 2 pp., aha! software corporation, Mountain View, CA.

Aha! software products, Web page List of Products, Sep. 24, 1997, pp. 1-5, aha! software corporation, Mountain View, CA.

Fulton, "10 Minute Guide to Excel 97", Que Publishing, Dec. 1996.

Blostein, et al., "Justification of Printed Music", Communications of the ACM, vol. 34, No. 3, Mar. 1991, pp. 88-99.

Gritchell, et al., "Sim: A Utility for Detecting Similarity in Computer Programs", ACM SIGSCE Bulletin, vol. 31, Issue 1, Mar. 1999, pp. 266-270.

Anderson, Corin R., et al., "Personalizing Web Sites for Mobile Users", Proceedings of the 10th International Conference on World Wide Web, Apr. 2001, pp. 565-575.

Das, Sumi, TechTV Vault, downloaded from http://www.g4tv.com/techtvvaulUfeatures/15435/DPWeb_DX_Palm_Browser.html, Apr. 7, 2000, pp. 1-3.

Gourley, John S., "A Language for Music Printing", Communications of the ACM, vol. 29, Issue 5, May 1986, pp. 388-401.

Furuta, Richard, et al., "Document Formatting Systems: Survey, Concepts, and Issues," ACM Computing Surveys (CSUR), vol. 14, Issue 3, Sep. 1982, pp. 417-472.

Chen, et al., "Incremental Document Formatting", Proceedings of the First ACM International Conference on Multimedia, Sep. 1993, pp. 93-100.

In the United States Patent and Trademark Office, Supplementary Notice of Allowability in re U.S. Appl. No. 10/141,772, Filed May 10, 2002, Dated Dec. 29, 2005, 2 pages.

In the United States Patent and Trademark Office, Notice of Allowance and Fee(s) Due in re U.S. Appl. No. 10/141,772, Filed May 10, 2002, Dated Nov. 29, 2005, 3 pages.

In the United States Patent and Trademark Office, Notice of Allowability in re U.S. Appl. No. 10/141,772, Filed May 10, 2002, 15 pages.

In the United States Patent and Trademark Office, Final Office Action in re U.S. Appl. No. 10/141,772, Filed May 10, 2002, Dated Aug. 2, 2005, 10 pages.

In the United States Patent and Trademark Office, Non-Final Office Action in re U.S. Appl. No. 10/141,772, Filed May 10, 2002, Dated Feb. 17, 2005, 9 pages.

Wunsche, B. et al.; A Scientific Visualization Schema Incorporating Perceptual Concepts, 2001, pp. 1-6.

Weinreich, H. et al.; The Look of the Link-Concepts for the User Interlace of Extended Hyperlinks, 2001, pp. 1-10.

Bjork, Staffan et al.; West: A Web Browser for Small Terminals, Proceedings of the 12th Annual ACM Symposium on User Interface Software and Technology, Nov. 1999, pp. 187-196.

Moran et al.; Pen-based Interaction Techniques for Organizing Material on an Electronic Whiteboard, UIST 97, copyright 1997 ACM, pp. 45-54.

Wilcox et al.; Dynomite: A Dynamically Organized Ink and Audio Notebook, CHI 97 Electronic Publication, Copyright ACM 1997, pp. 1-15.

In the United States Patent and Trademark Office, Notice of Abandonment in re: U.S. Appl. No. 11/031,001, filed Jan. 10, 2005, 3 pages, mailed Apr. 9, 2007.

In the United States Patent and Trademark Office, Final Office Action in re: U.S. Appl. No. 11/031,001, filed Jan. 10, 2005, 9 pages, mailed Jul. 21, 2006.

In the United States Patent and Trademark Office, Non-Final Office Action in re: U.S. Appl. No. 11/031,001, filed Jan. 10, 2005, 9 pages, mailed Feb. 1, 2006.

In the United States Patent and Trademark Office, Non-Final Office Action in re: U.S. Appl. No. 11/031,001, filed Jan. 10, 2005, 9 pages, mailed Sep. 26, 2005.

In the United States Patent and Trademark Office, Non-Final Office Action in re: U.S. Appl. No. 11/031,001, filed Jan. 10, 2005, 8 pages, mailed Apr. 27, 2005.

In the United States Patent and Trademark Office, Notice of Allowance in re: U.S. Appl. No. 11/338,850, filed Jan. 25, 2006, 7 pages, mailed Oct. 22, 2009.

In the United States Patent and Trademark Office, Non-Final Office Action in re: U.S. Appl. No. 11/338,850, filed Jan. 25, 2006, 13 pages, mailed May 19, 2009.

* cited by examiner

ADDING AND REMOVING WHITE SPACE FROM A DOCUMENT

CROSS-REFERENCE TO RELATED APPLICATION

This application is a continuation application of and claims priority to U.S. application Ser. No. 10/141,772, filed May 10, 2002, which is incorporated herein in its entirety, and which is has issued having U.S. Pat. No. 7,028,256.

BACKGROUND OF INVENTION

1. Technical Field

The present invention relates to maintaining a page layout when adding new blank space to an electronic page that already contains content. More specifically, the present invention relates to growing the size of an electronic page when adding an item to the page, so that all of the items originally appearing in the page remain in that page, rather than being pushed onto a new page, deleted or clipped.

2. Related Art

As hand-held computers are becoming more prevalent, more and more people are note-taking, sketching or diagramming content onto "electronic" paper rather than physical paper. As used herein, the term electronic paper refers to electronic data that can be subsequently rendered on a display so as to resemble a paper document. Like physical paper, electronic paper is conventionally divided into discrete portions or "pages" that allow a user to quickly access specific portions of the electronic paper without having to scroll through the entire document. These pages typically are formatted with same sizes as actual paper (for example, 8½×11 inches). Unlike physical paper, however, electronic paper advantageously allows a user to easily insert additional content anywhere on a page, even if that location already contains content. The existing content is simply "pushed down" the page to allow room for insertion of the new content.

A variety of software applications employ electronic paper, such as Microsoft Word and Microsoft Windows Journal One application of electronic paper that is particularly useful for users of hand-held computers is electronic ink. Electronic ink allows a user to create data by writing on a digitizer with a stylus. The digitizer records the user's writing as a sequence of strokes, where each stroke is comprised of a sequence of points. The points may be represented using a variety of known techniques including Cartesian coordinates (X, Y), polar coordinates (r, Θ), and other techniques as known in the art. The strokes may be associated with a set of properties such as, for example, color, width, pressure between the stylus and digitizer, and angle between the stylus and digitizer, and pen shape and the like.

As previously noted, a significant advantage to electronic ink, and to electronic paper generally, is the ease with which a user can place and move content around the electronic paper. Various applications of electronic ink, for example, allow a user to open up new white space on the electronic paper simply by "pushing" all of other content down the page. Thus, unlike actual paper, a user can go to a relevant portion of a page that already contains content, insert white space, and then write additional content in the added white space. The value of this feature is limited, however, by the size of the page being used by the electronic paper application. If the user inserts enough space into a page, eventually some of the content on that page will be pushed off the bottom of the page and onto the top of the next page, clipped, or deleted.

Pushing content off of a page onto the subsequent page may create an undesired cascading effect on all following pages. For example, diagrams may become split across pages, labels may become separated from their associated pictures, content may be caused to be regrouped in unexpected ways, and notes may become separated from associated content. This inadvertent cascading may frustrate the ease and convenience offered by the flexibility of electronic paper. Even if a user expected content to be split across pages, it is rarely the case where the system would correctly split the content as there are fewer ways for the system to know where to split the context across pages. Free form input cannot be split as easily as text across multiple pages.

Similarly, electronic paper allows a user to easily remove content or space from an existing document. Conventionally, however, deleting content from one page may "pull" content from a subsequent page onto the page from which the content or space has been removed. This "pulling" may likewise create an undesired effect on the following pages.

SUMMARY

In some aspects, the present invention addresses this disadvantage of conventional electronic paper by allowing a user to grow the size of a page of electronic paper when the user adds white space to the page, such that all of the content originally on the page remains on that page. Some aspects of the invention also allow a user to shrink the size of a page of electronic paper when deleting space or content from the page.

BRIEF DESCRIPTION OF THE DRAWINGS

The present invention is described with respect to the accompanying figures, in which like reference numerals identify like elements, and in which:

FIGS. 3A-3G depict white space being inserted into the content of an electronic page;

FIGS. 4A-4D depict a portion of a page being removed from an electronic document;

DETAILED DESCRIPTION OF THE DRAWINGS

General Purpose Computer

Figure 1:
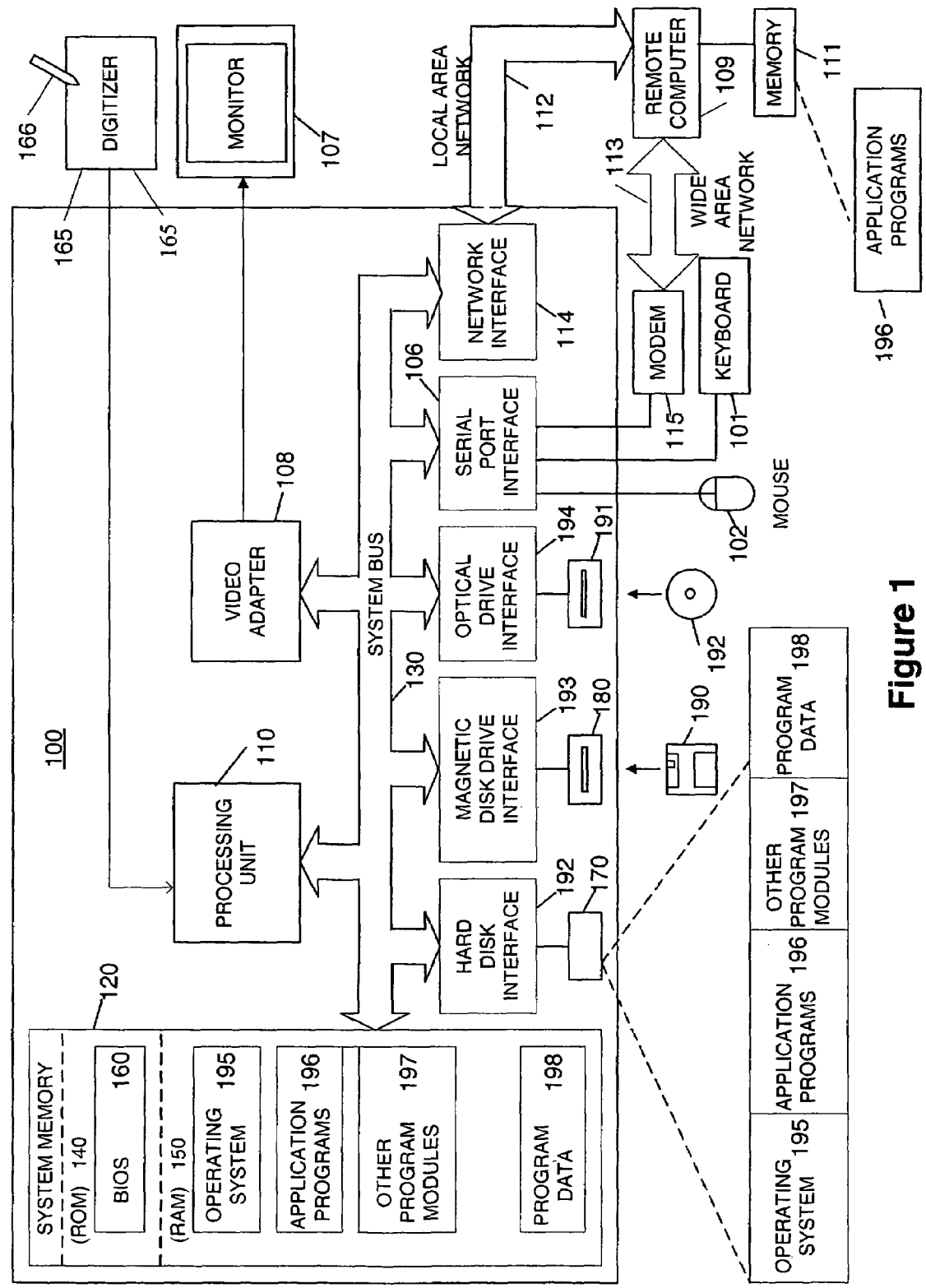
FIG. 1 shows a computing environment in which one or more aspects of the present invention may be implemented.

FIG. 1 illustrates a schematic diagram of an exemplary conventional general-purpose digital computing environment that may be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by the computer 100, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices may be connected to the processing unit 110 through a serial port interface 106 that is coupled to the system bus, but may also be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. A pen digitizer 165 and accompanying pen or stylus 166 may be provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, one may have the usable input area of the digitizer 165 be coextensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 1 environment shows an exemplary environment, it will be understood that other computing environments may also be used. For example, one or more embodiments of the present invention may use an environment having fewer than all of the various aspects shown in FIG. 1 and described above, and these aspects may appear in various combinations and sub-combinations that will be apparent to one of ordinary skill.

Tablet PC

Figure 2:
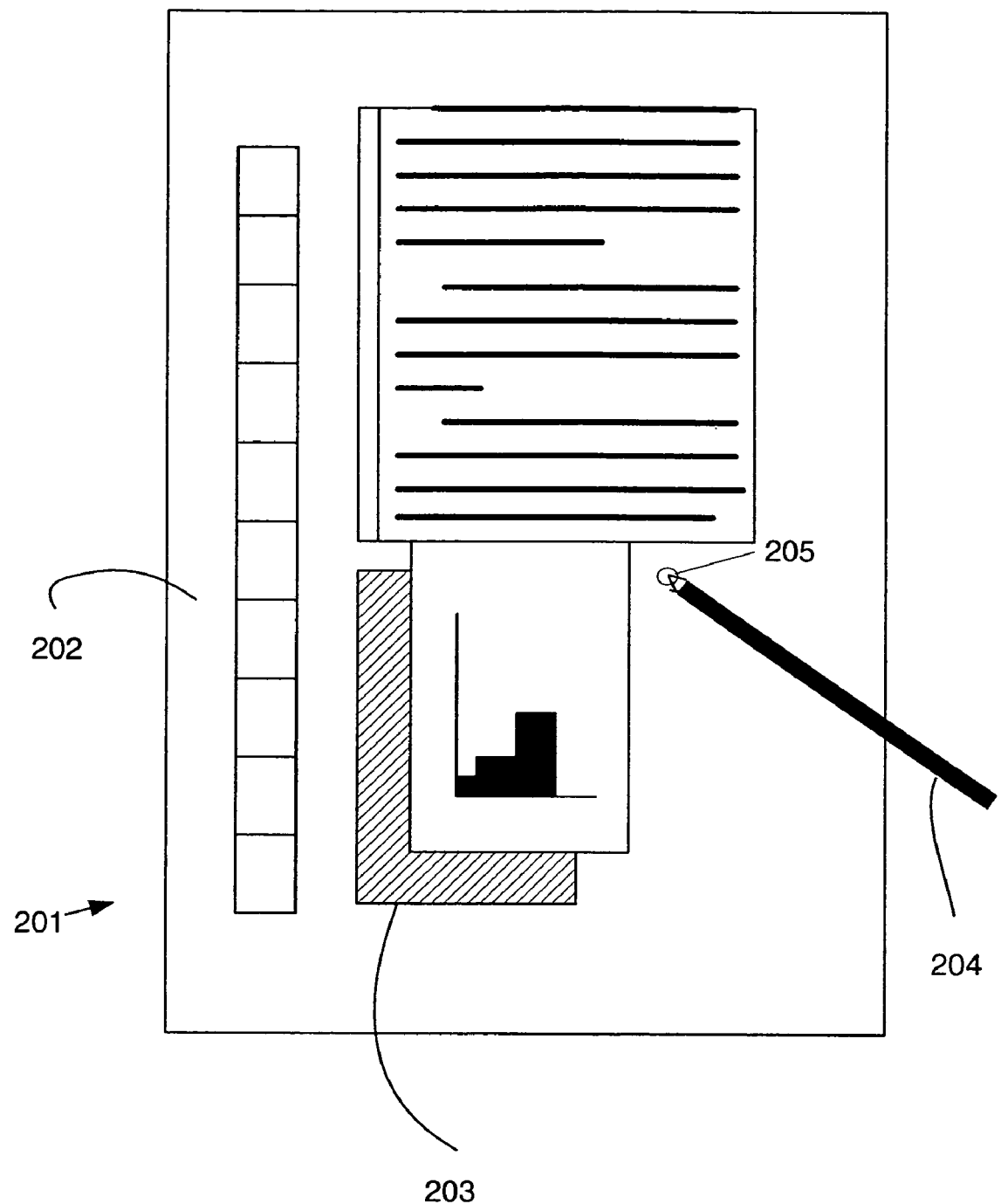
FIG. 2 shows a tablet computer configuration on which one or more embodiments of the present invention may be implemented.

FIG. 2 illustrates an exemplary tablet PC 201 that can be used in accordance with various aspects of the present invention. Any or all of the features, subsystems, and functions in the system of FIG. 1 can be included in the computer of FIG. 2. Tablet PC 201 includes a large display surface 202, for example, a digitizing flat panel display such as a liquid crystal display (LCD) screen, on which a plurality of windows 203 may be displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, such as optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. Thus, the stylus 204 could be implemented as a "pencil" or "pen", in which one end constitutes a writing portion and the other end constitutes an "eraser" end, and which, when moved across the display, indicates portions of the display that are to be erased. Other types of input devices, such as a mouse, trackball, or the like could additionally or alternately be used to enter, modify or delete data. Further, a user's own finger could be employed as the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 has contacted the display surface 202.

FIGS. 3A-3G depict various display screens and the associated process that may appear in one embodiment when a user wishes to insert space into an electronic page of a document. The various display screens assume that the original page size is equal to the display screen size; although the original page size may be any size. It is appreciated that if the original document was smaller than the display or the same size of the display, the scroll bars may be removed.

Insertion of White Space and Growing a Page

Figure 3A:
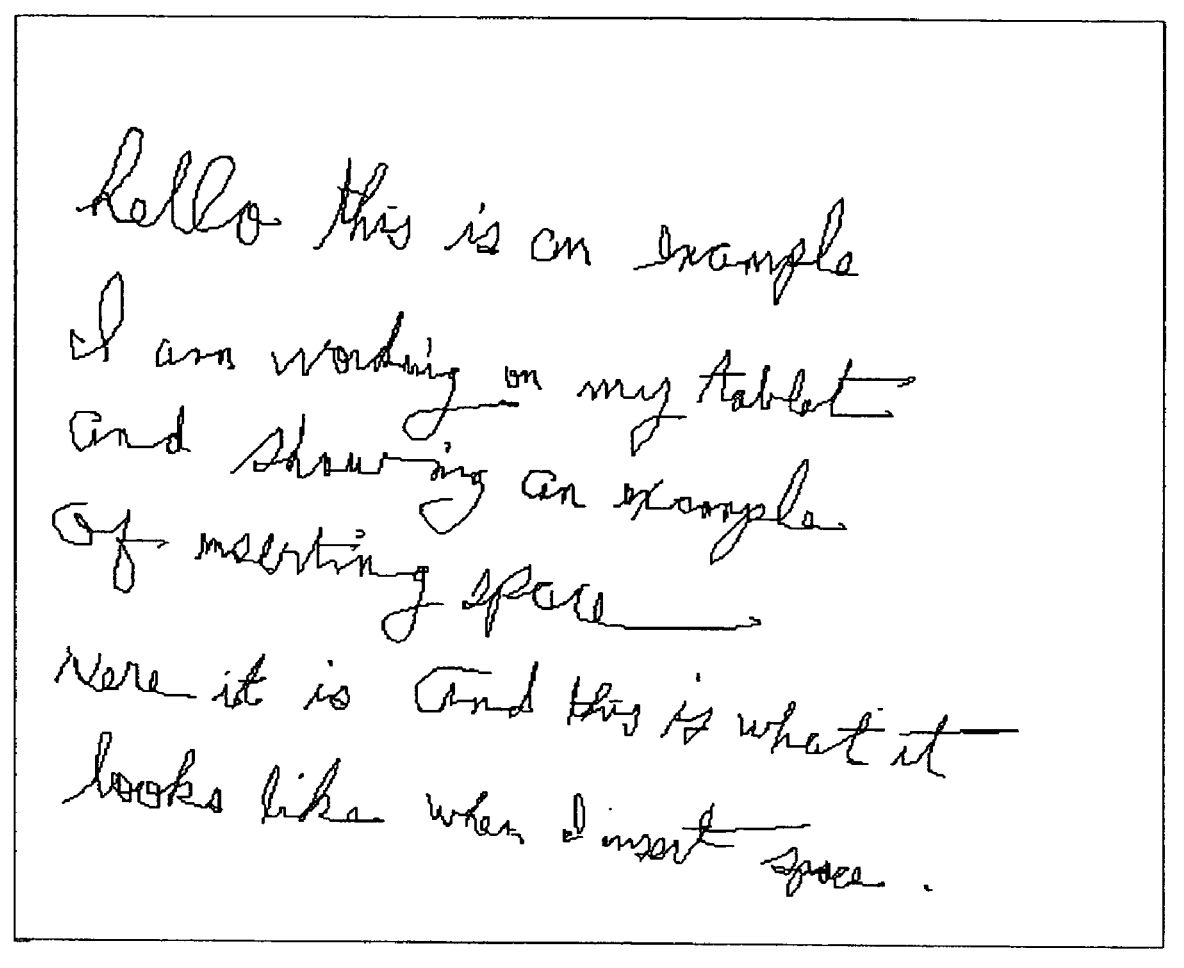

FIG. 3A shows a display screen having a page of text, in the form of electronic ink. A user may, for example, wish to insert additional text into the middle of the content that is already present on the page. For example, the text of FIG. 3 may have columns or be in a table and a user wishes to add additional space for the columns or table. In order to provide a blank area in the page into which to insert this additional text, the user will first insert empty or "white" space into the content where the additional text will be added. The user may initiate this process by activating an "insert space" command. As will be appreciated by those of ordinary skill in the art, this command may take a variety of forms. It may be presented, for example, on a task bar, a purpose-specific user interface menu, or included in a pull down menu. Further, a user may activate the insert space command by depressing one or more buttons on a toolbar, keyboard, stylus, mouse or other input device. In some embodiments, the button operation may be followed by a subsequent stylus or mouse operation that inserts blank space or deletes blank space depending on the direction of the operation.

Figure 3B:
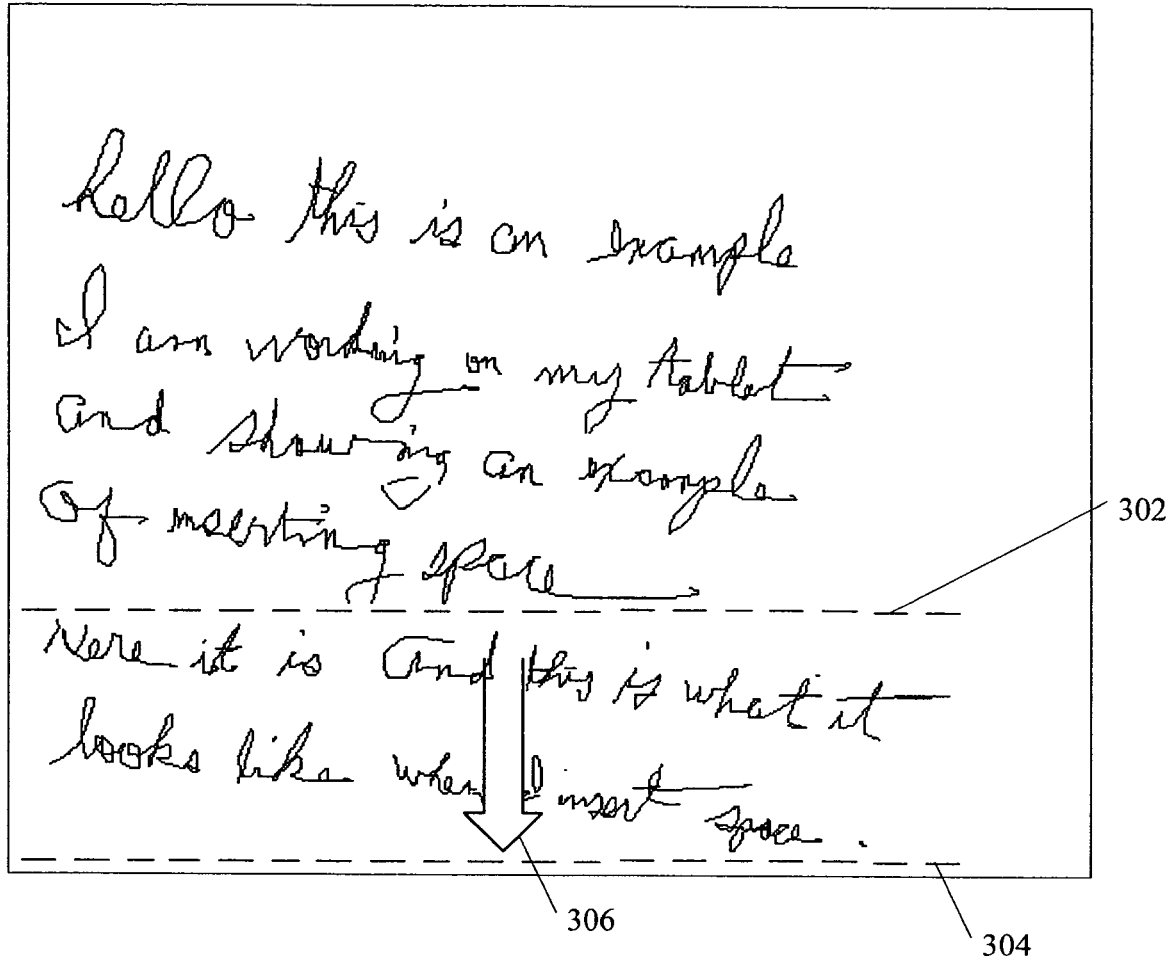

As shown in FIG. 3B, after the user has activated the insert space command, the user begins the process of inserting the white space into the page. As seen in this figure, the user employs an input device to indicate an origination line 302 for inserting the white space. Alternative approaches to entering space include inserting a default amount of space based on a click or tap, using a diagonal line to designate start and stop positions, and drawing a complex line to designate which content should be shifted. The user may, for example, touch or tap the display screen with the input device to create the origination line 302. Next, the user drags the user input device to define the desired amount of white space to be inserted into the page. For example, as shown in FIG. 3B, the user drags the input device in a downward direction for a distance equal to the amount of white space the user desires to be inserted into the page.

Alternatively, the application may use the page structure to decide how the page should grow. For example, in a multiple column layout, inserting space in one column may only insert space in the column and not the other column When the user has defined the amount of white space to be inserted into the page, the user stops dragging the input device. Stopping the dragging of the input device creates an insertion line 304. With some embodiments of the invention, a downwardly pointing arrow 306 may be displayed in order to confirm for the user that space is being inserted. While FIG. 3B illustrates an example where white space is inserted by dragging an input device in a downward direction, with some embodiments of the invention a user may alternately or additionally add white space by dragging the input device in an upward direction. With these embodiments, an upwardly pointing arrow may be displayed to indicate the insertion of white space. The adding of the additional space may occur during the operation of the input device or may occur at the end of the operation of the input device. For example, the addition of the space may occur at the pen up event of a stylus or a button up event for a mouse (using a click and drag technique).

Figure 3C:
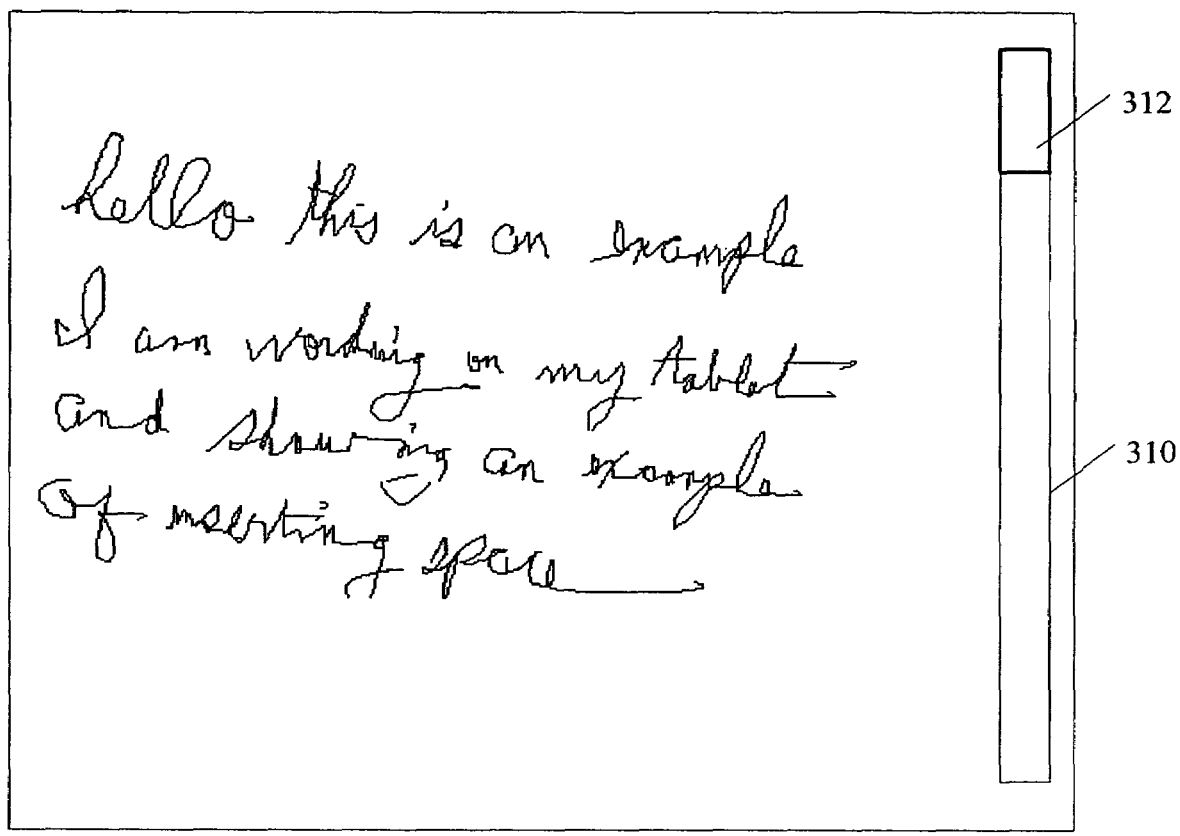

FIG. 3C shows the result of inserting the desired white space according to the invention. Conventionally, adding the white space would have caused the content appearing after the insertion line to be moved onto the subsequent page or clipped. With the invention, however, the size of the page containing the content is automatically grown so that the page includes both the added white space and all of the original content appearing on the page. In one example, enough space may be added so that the lowest content on the page moves to the bottom of the page. In other words, the height of the page may be increased by the distance indicated by a user subtracting out the available white space between the last item on the page and the bottom of the page. Alternatively, one may increase the height of the page by the distance indicated by a user. Further, with some embodiments of the invention, only the page having the inserted white space is grown, leaving the sizes of any other pages in the document unchanged. Of course, with alternate embodiments of the invention, the size of some or all of the other pages of the document may be grown to match that of the page with the inserted white space.

Figure 3D:
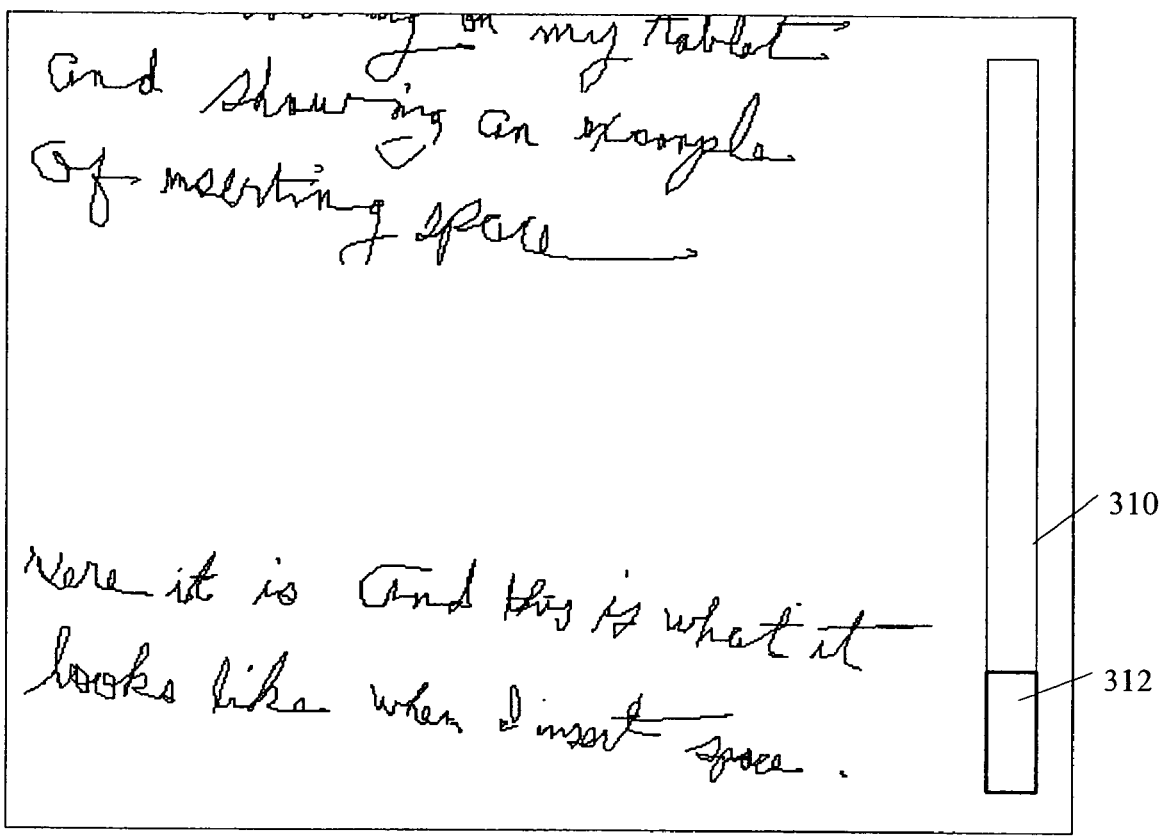

As shown in FIGS. 3C and 3D, inserting the white space causes the length of the page to be grown too long to be displayed on a single display screen. Thus, a vertical scrolling indicator 310 and a vertical scrolling element 312 may be displayed with the grown page. The position of vertical scrolling element 312 in FIG. 3C indicates that the top portion of the page is visible. The position of vertical scrolling element 312 in FIG. 3D indicates that the bottom portion of the page is visible. As will be appreciated by those of ordinary skill in the art, the user may change the position of the vertical scrolling element 312 along the indicator 310 in order to view different portions of the grown page.

Figure 3E:
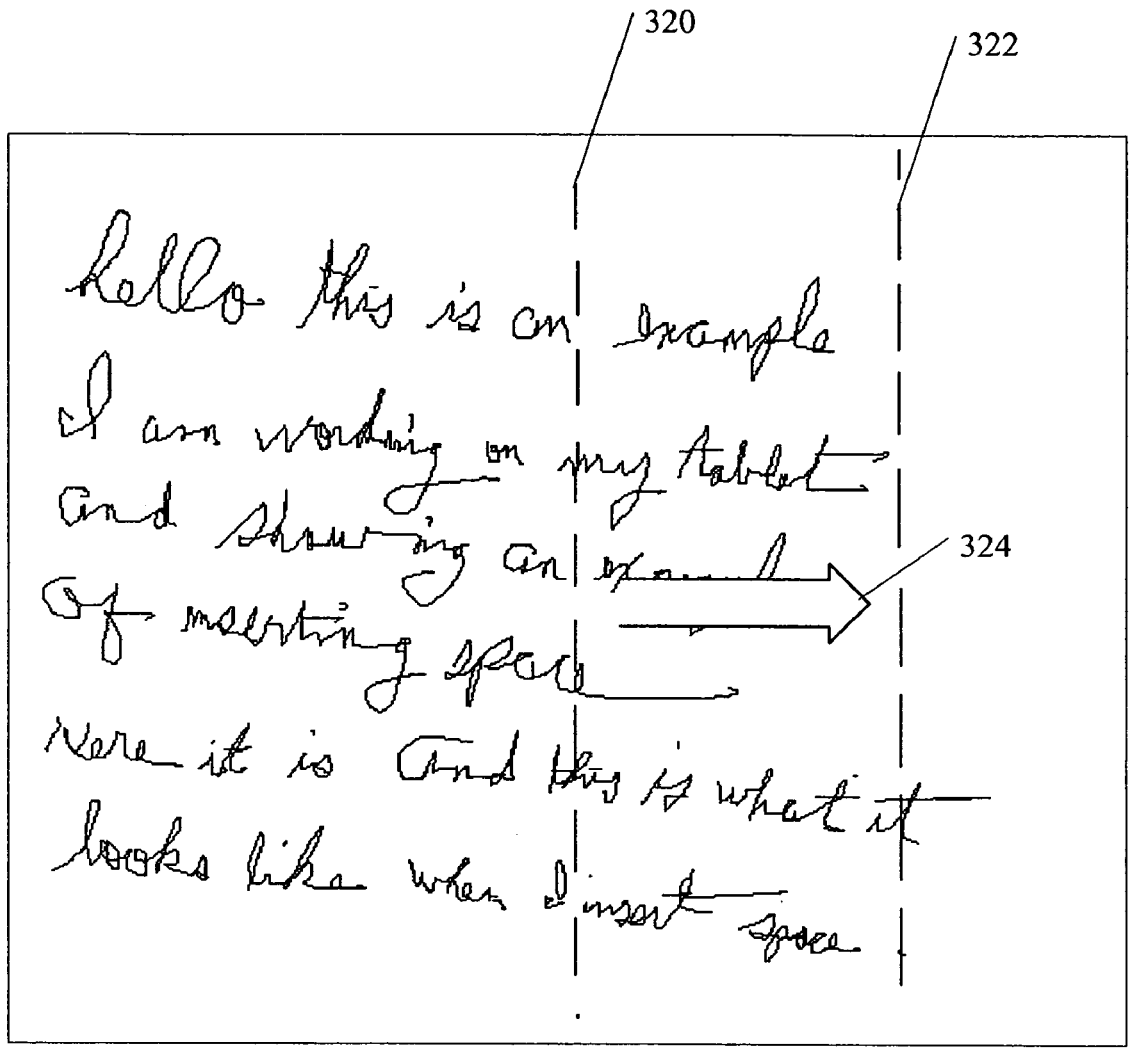

FIG. 3E contains the same text as shown in FIG. 3A, but this figure illustrates how some embodiments of the invention may allow a user to horizontally (as opposed to vertically) insert white space into the page. In particular, FIG. 3E shows a vertical origination line 320 and a vertical insertion line 322. Origination line 320 may be established my touching or tapping the screen with a user input device, as was described with reference to FIG. 3B above. Insertion line 322 may similarly be established by, for example, horizontally dragging the input device in a rightward direction and stopping the input device where the insertion line 322 is to be established.

Again, various embodiments of the invention may display a rightward pointing arrow 324 to confirm that white space is being horizontally inserted. Also, while FIG. 3E illustrates an example where white space is inserted horizontally by dragging an input device in a rightward direction, with some embodiments of the invention a user may alternately or additionally horizontally add white space by dragging the input device in a leftward direction. With these embodiments, a leftward pointing arrow may be displayed to indicate the horizontal insertion of white space. It is appreciated that the direction of inserting space may be independent of the direction of text flow for a language or may be independent of the direction of text flow of the language.

Figure 3F:
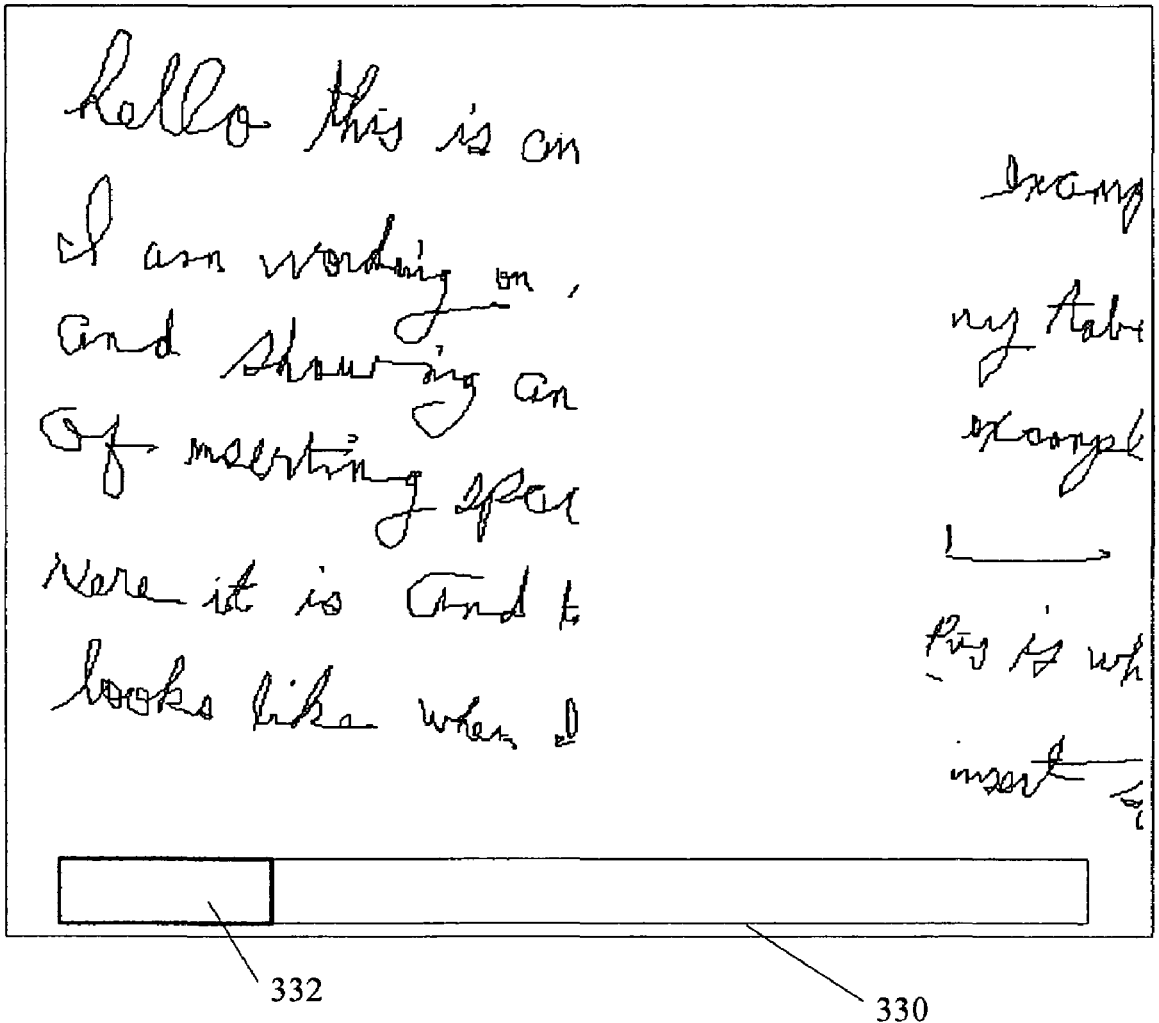

FIG. 3F shows the result of the insertion operation. As seen in this figure, the content that appeared to the right of the origination line 320 is horizontally moved to the right past the insertion line 324. Moreover, the width of the page is automatically grown so that, even with the addition of the white space, all of the text appearing on the original page remains on that page. With some embodiments of the invention, only the page having the inserted white space is grown, leaving the sizes of any other pages in the document unchanged. Of course, with alternate embodiments of the invention, the size of some or all of the other pages of the document may be grown to match that of the page with the inserted white space.

Figure 3G:
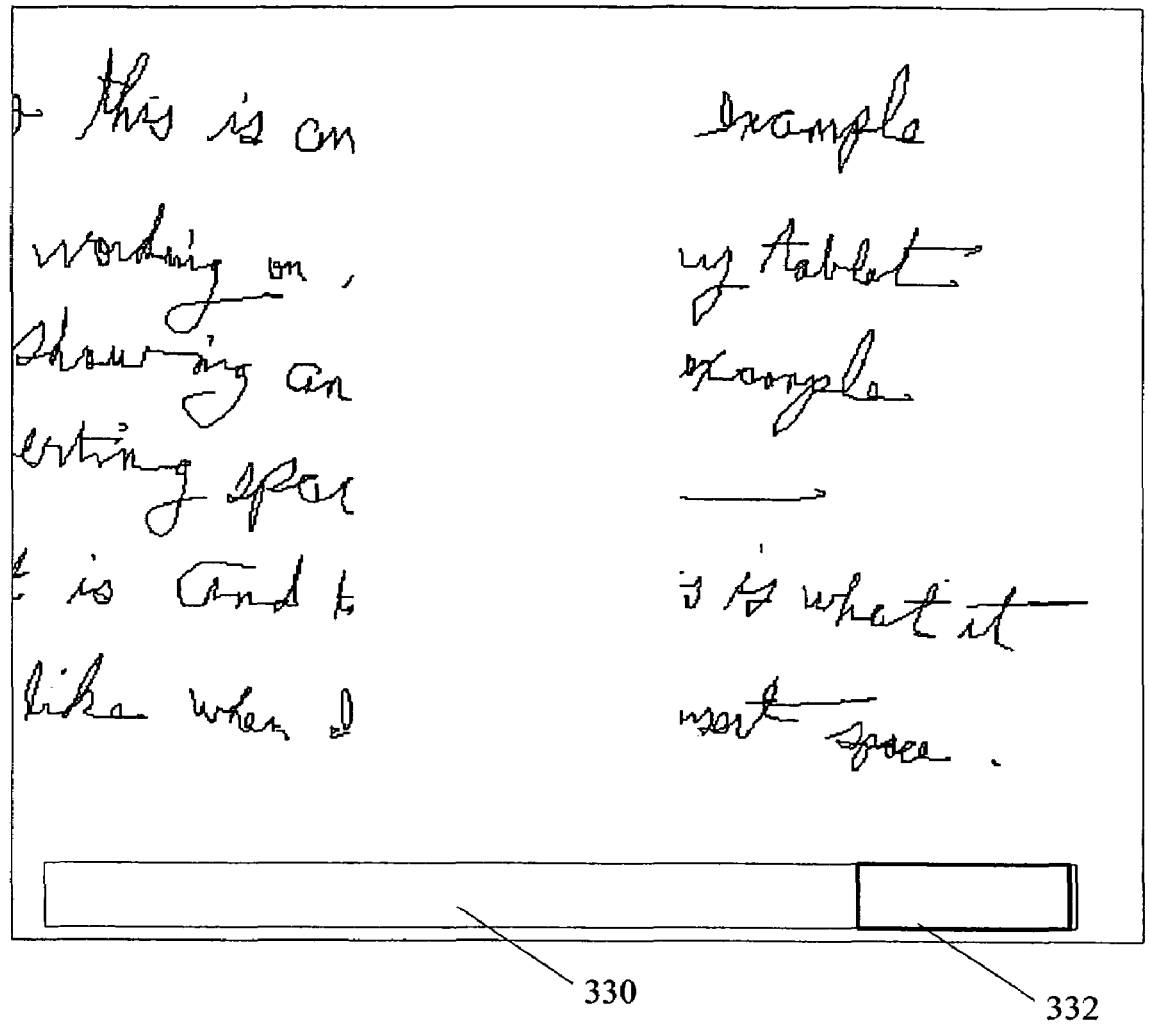

As seen in FIGS. 3F and 3G, with the horizontally inserted white space the entire page cannot be displayed at one time. Accordingly, various embodiments of the invention may display a horizontal scrolling indicator 330 with a horizontal scrolling element 332. In FIG. 3F, the horizontal scrolling element 332 being in the leftmost position along the horizontal scrolling element 330 indicates that the leftmost portion of the page is visible. The horizontal scrolling element 332 may be dragged along the horizontal scrolling indicator 330 by the user input device to cause a different portion of the page to be displayed. In FIG. 3G, the horizontal scrolling element 332 being in the rightmost position along the horizontal scrolling indicator 330 indicates that the rightmost portion of the page is visible on the display. It is appreciated that the scroll bars may be eliminated through various techniques known in the art including changing the zoom level.

In another embodiment, space is added only as needed to keep all content on the page. If the original page was completely full of content, the page may be grown by an amount corresponding to the amount of the white space indicated in the received input. However, if the original page had open white space at the bottom of the page which was equal to or greater than the amount of the white space to be inserted, then the page would not grow as space was readily available. Further, if the original page had blank space at the bottom which was some fraction of the size of the white space being inserted, then the page may be grown to the difference between the space inserted and the blank space at the bottom of the page. This approach may also be applied to other sections of the page as, for example, in the case of languages with different directional flow or flows.

Shrinking A Page

In addition to allowing a user to insert white space into a page, various embodiments of the invention may allow a user to delete space from a page in a similar manner. With some embodiments of the invention, for example, deleting space from a page may shrink the page by an amount corresponding to the deleted portion. With alternate embodiments of the invention, the deletion of space or content from a page may cause the page size to shrink, although the page size may never become smaller than the original page size.

Figure 4A:
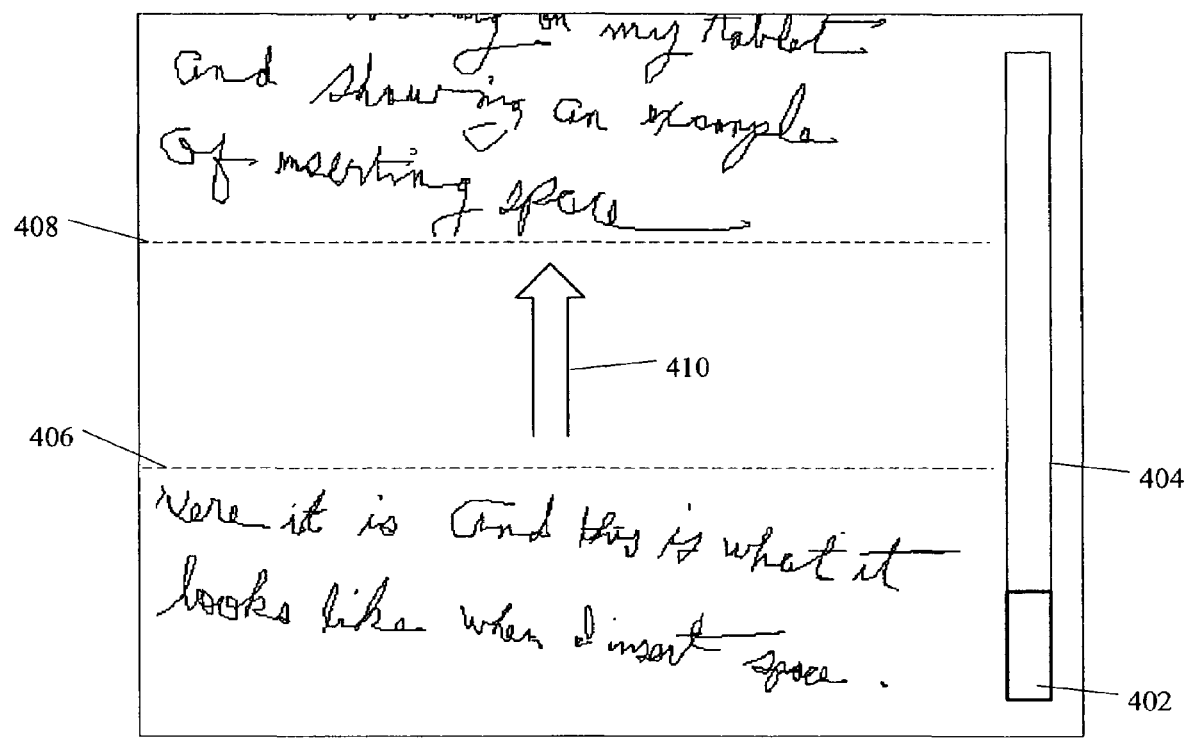

FIGS. 4A-4D help illustrate an example of how the invention shrinks the size of a page when empty space is deleted from the page. For example, a column of space may have been deleted or a portion of a table deleted. Turning first to FIG. 4A, this figure shows the same page of text as in FIGS. 3C and 3D. (As described above, this particular page was previously grown in length when empty space was added to the page.) Vertical scrolling element 402 is at the bottom of vertical scrolling indicator 404, indicating that the bottom portion of the page is visible.

To delete space from the page, the user may initiate the deletion process by activating a "delete space" command. As with the "insert space" command, those of ordinary skill in the art will appreciate that this command may take a variety of forms. It may be presented, for example, on a task bar, a purpose-specific user interface menu, or included in a pull down menu. Further, a user may activate the insert space command by depressing a specified combination of buttons on a keyboard, stylus, mouse or other input device.

After the delete space command has been activated, the user may begin the deletion process by creating an origination line 406 marking the first border of the space to be deleted. With some embodiments of the invention, the user may, for example, create the origination line 406 by touching or tapping the screen with the user input device. Next, the user creates a deletion line 408 marking the opposite border of the space to be deleted from the page. The user may, for example, create the deletion line 408 simply by dragging the user input device from the origination line 406 to a position where the user desires to establish the deletion line 408.

With some embodiments of the invention, an upwardly pointing arrow 410 or other cursor may be displayed, to confirm for the user that a delete space operation is to be performed. Of course, while the illustrated embodiment shows an example where space is deleted by dragging an input device in an upward direction, with some embodiments of the invention a user may alternately or additionally delete space from the page by dragging the input device in a downward direction. With these embodiments, a downwardly pointing arrow or other cursor may be displayed to indicate the deletion of space. Thus, the user may establish line 408 as the origination line and line 406 as the deletion line by dragging the user input device downward from line 408 to where the user desires to establish deletion line 406. Further, the application may delete the white space surrounding an indicated deletion point.

Figure 4B:
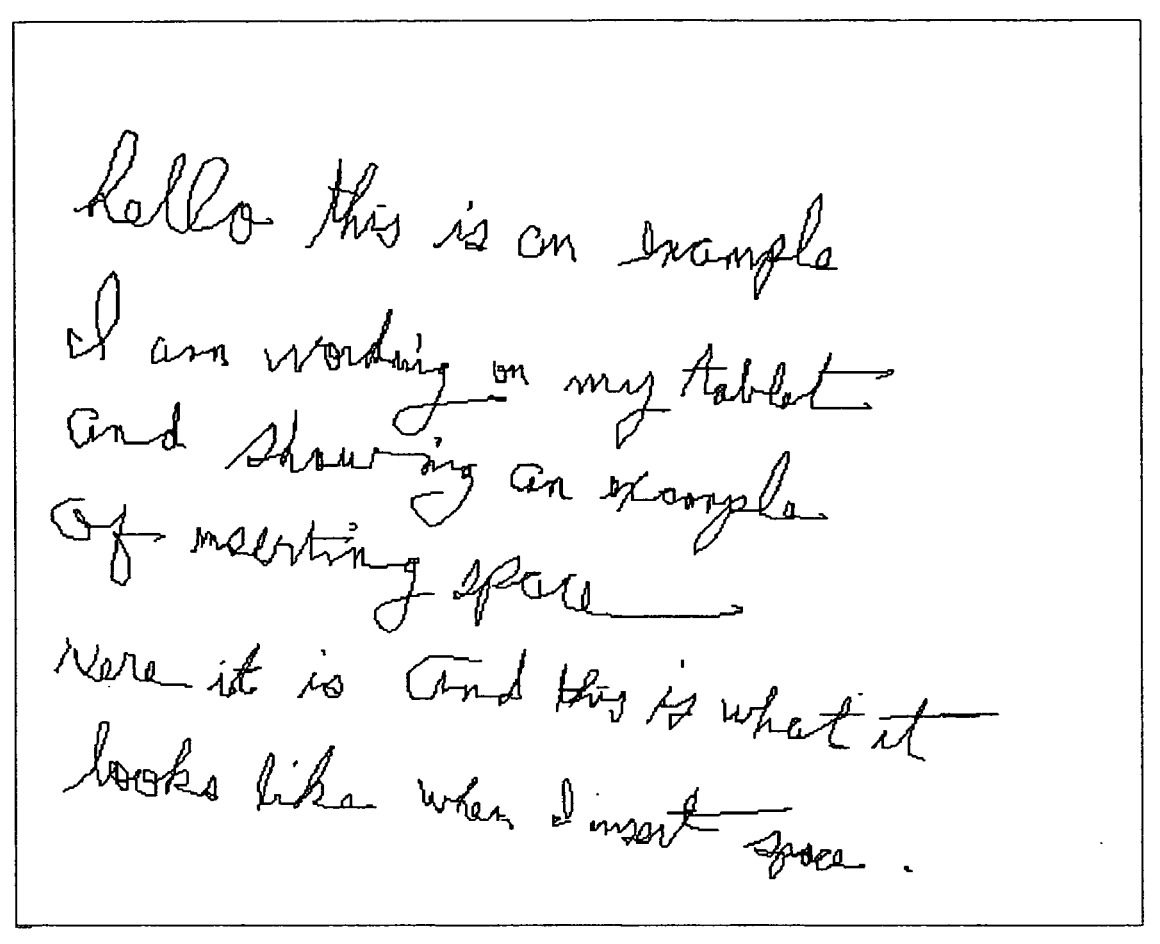

FIG. 4B shows the result of the space deletion operation. The space between the origination line 406 and the deletion line 408 is deleted, and the text appearing below the origination line 406 is moved upward to close the space. Because the previously existing page size is no longer needed to contain the entire contents of the page, the length of the page is decreased. With some embodiments of the invention, the length of the page will be decreased by an amount corresponding to the deleted space, so that the contents of the subsequent pages remain in those same pages. With alternate embodiments of the invention, however, the page size may not be decreased to a size smaller than an original page size. Further, some embodiments of the invention may leave the size of other pages in the document unchanged, while still other embodiments of the invention may shrink the size of other pages in the document to match that of the page from which space was deleted.

Figure 4C:
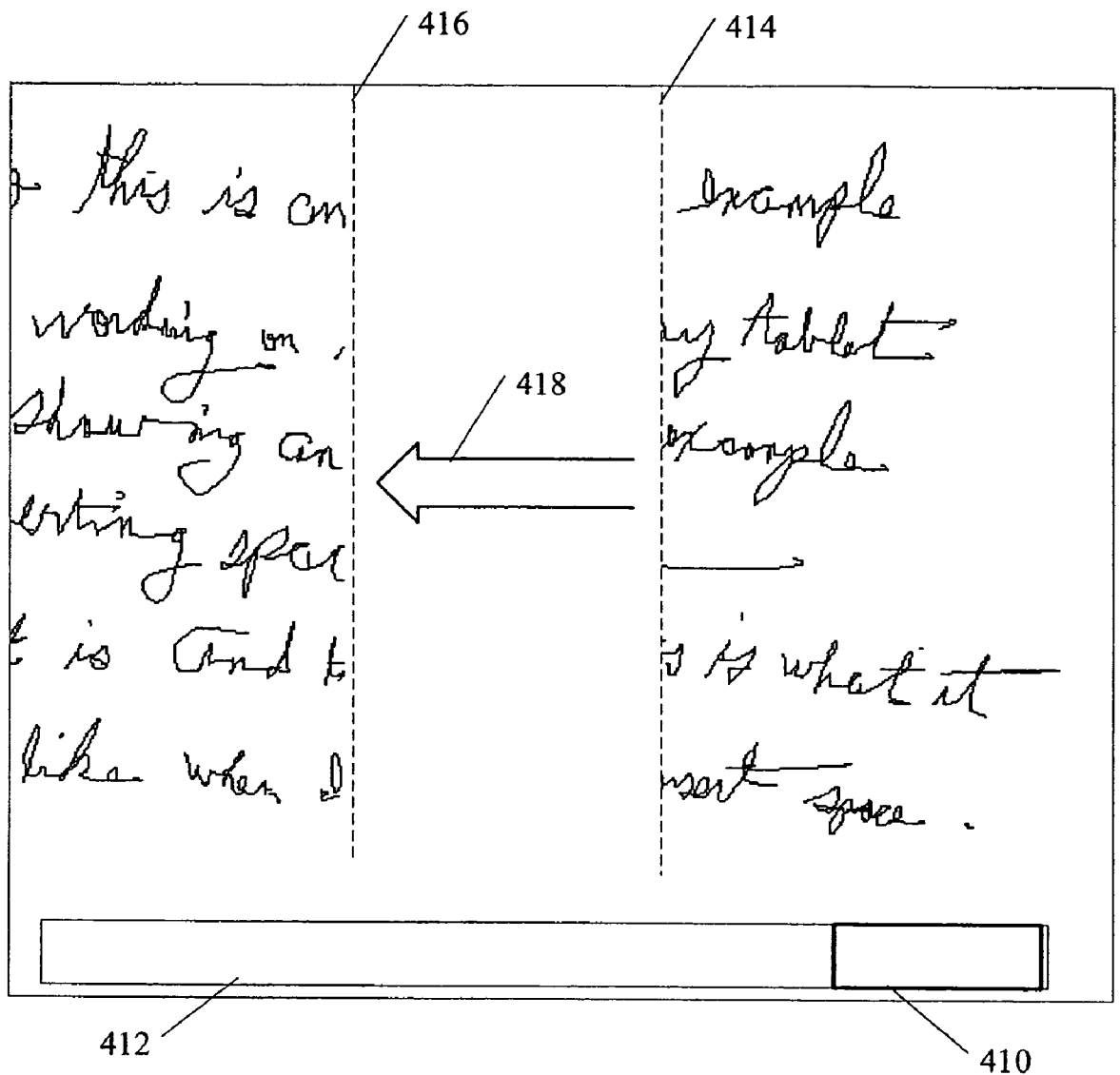

FIG. 4C shows a space deletion operation about to be performed on the text previously illustrated in FIGS. 3F and 3G. (As described above, white space had previously been added to the page causing the width of the page to grow.) Because the entire page cannot be displayed at one time, a horizontal scrolling indicator 412 and a horizontal scrolling element 410 are displayed to indicate to the user that only a portion of the entire page is visible. In particular, the horizontal scrolling element 410 being in the rightmost position along the horizontal scrolling indicator 412 indicates that only the rightmost portion of the page is visible.

As with the previously described embodiment, after activating the delete space command, the user may establish an origination line 414 by touching or tapping the screen with a user input device at the desired point. The user may then establish the deletion line 416 by, for example, dragging the user input device in a leftward direction and stopping the input device at the point where the deletion line 416 is desired. With some embodiments of the invention, the user may alternately or additionally establish line 416 as the origination line and line 414 as the deletion line by dragging the input device from line 416 rightward and stopping where the user desires to establish the deletion line 414. Again, various embodiments of the invention may display an appropriately directed arrow 418 or other cursor to confirm the deletion operation.

Figure 4D:
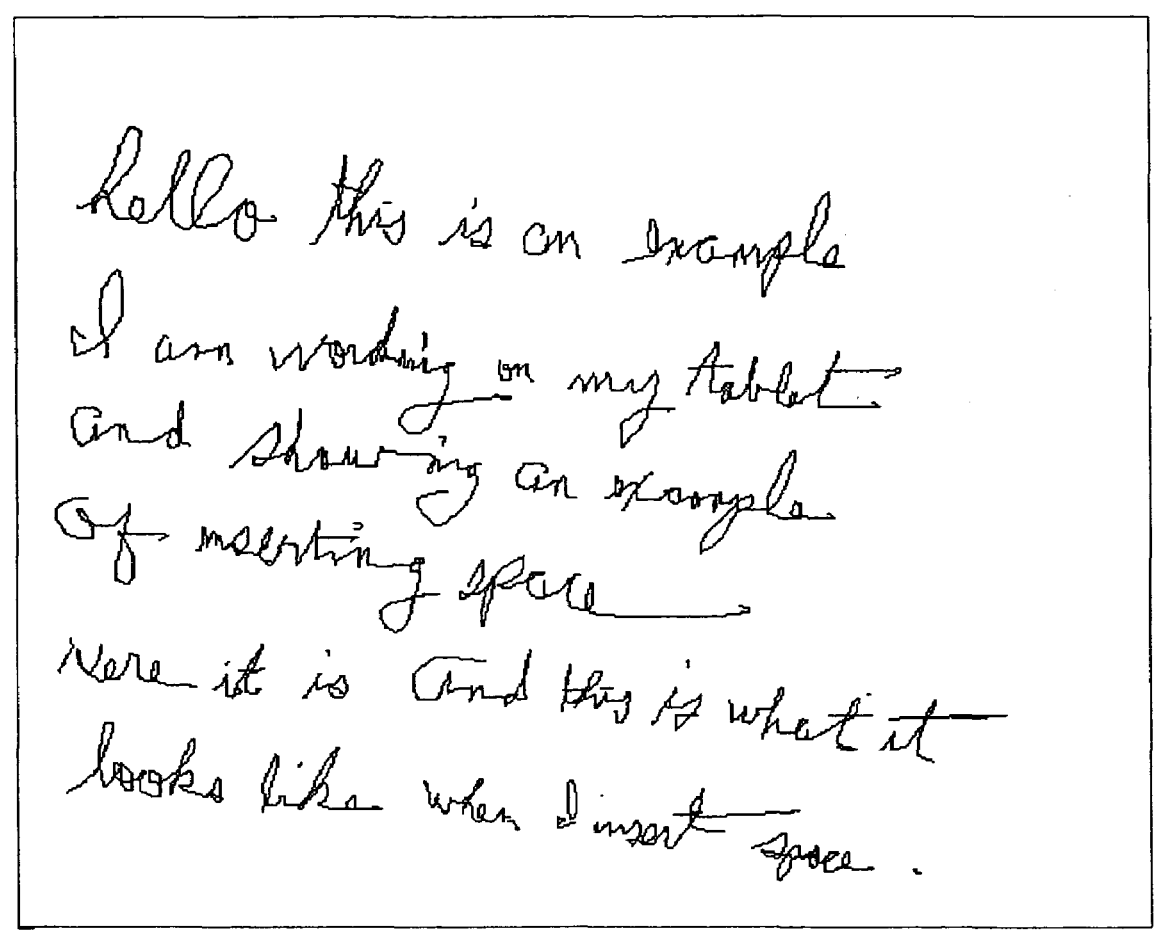

FIG. 4D shows the result of the space deletion operation. The contents of the page to the right of line 414 are moved toward the left to close up the space. Moreover, because the extended page width is no longer needed to keep the entire contents of the page on the same page, the page width may be decreased. In some embodiments of the invention, the page width may be decreased by an amount corresponding to the amount of space deleted from the page. With alternate embodiments of the invention, however, the page width is decreased only up to a distance where the page width is equal to the original page width.

In a further embodiment, a page of content may be grown by adding blank space at the bottom of a page and growing the page.

It should be noted that, while the space deletion operation was described above with regard pages that had been previously expanded to contain additional space, the invention is not so limited. As will be appreciated by those of ordinary skill in the art, some embodiments of the invention may allow a user to shrink the length, width, or both of a page that has not previously been expanded when space is deleted from that page.

Method for Growing a Page

Figure 5:
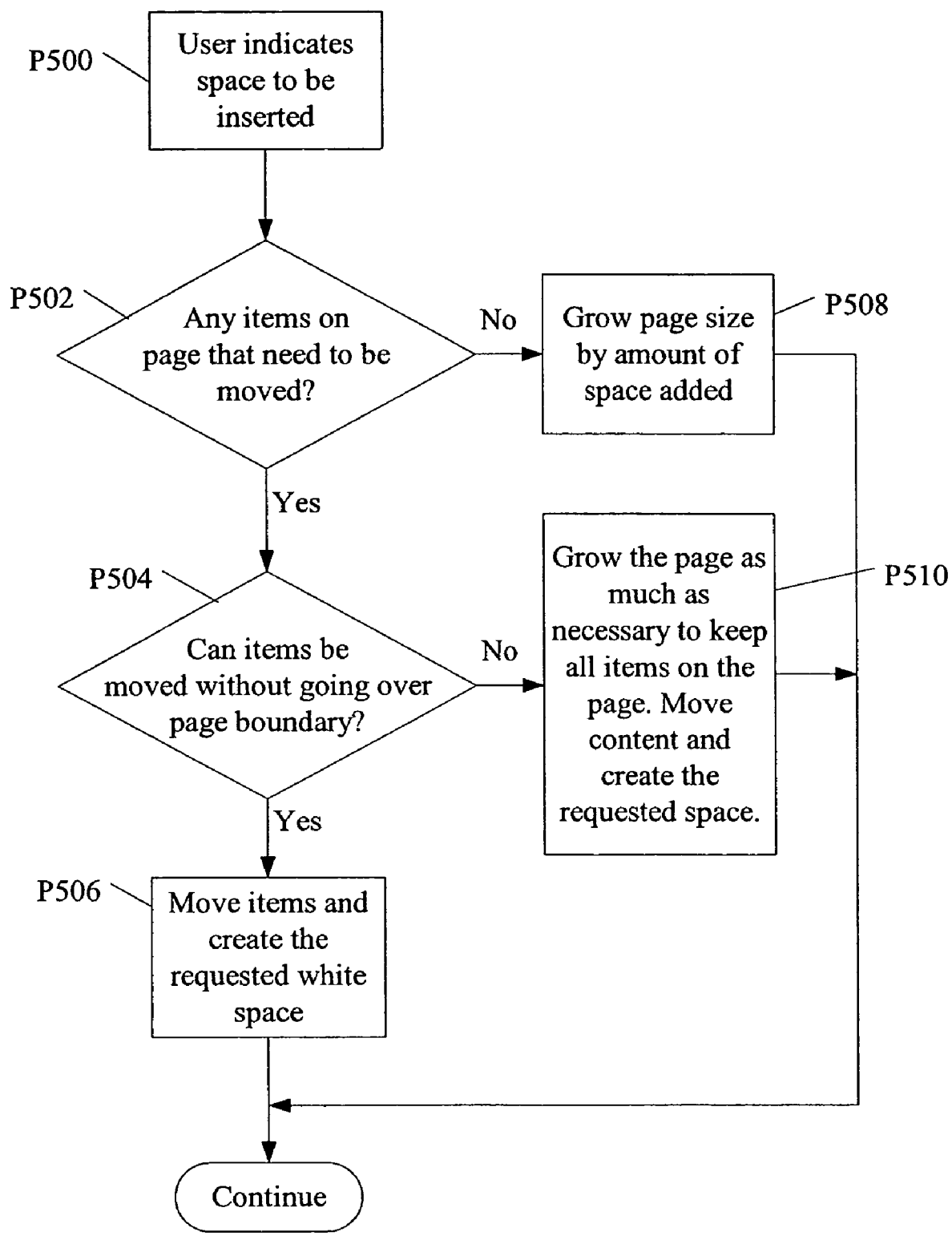
FIG. 5 is a flowchart for explaining processing that occurs, in an embodiment of the invention, when adding white space to a page of an electronic document.

FIG. 5 illustrates the process, in one embodiment of the invention, for inserting space into an electronic page. Starting at step P500, the user first indicates that space is to be inserted by establishing an origination line and an insertion line. This may be done in the manner described earlier with reference to FIGS. 3A-3G.

Next, at step P502, a check is performed to determine whether there are any items on the page after the origination line. If there are items on the page that would be moved, then at P504, a check is performed to determine whether this content can be moved to provide the desired white space without causing some of that content to be moved to another page or clipped. If that content can be moved without moving some of the content to another page, then at P506, the content is moved and the space is created.

If the check performed at step P502 determines that there are no items that need to be moved, then, at P508, the page is grown by an amount corresponding to the amount of the space added. For example, if space of width d is being added horizontally, then the page width is similarly grown by width d. If space of length d is being added vertically, then the page length is similarly grown by length d.

If the check at P504 determines that the items cannot be moved without at least some of the items being moved to another page (or clipped), then at P510, the page is grown as much as necessary so that the items may remain on the same page, while leaving unchanged the page size of other pages. If space is being added horizontally, then the page width is grown. If space is being added vertically, then the page length is grown.

Alternative embodiments include various approaches to determining which items to move. For example, if given percentage (e.g. 50%) of an item (for instance, a word or paragraph or character) is below the origination line, then that item may be moved. Other approaches include using a fixed amount of the item is below the origination line to determine if it should be moved. A further approach includes using the structure of the page or document to group items using their relationship to other items. So, for example, a complex path used for the origination line drawn in a paragraph may result in all content below and/or to the right of the line be moved. So, a line drawn through a sentence may move all items after the line.

With some embodiments of the invention, at step P510, before growing the page, a determination can be made as to whether any empty space exists within the area to be moved. If such empty space does exist, the empty space is removed to the extent necessary to prevent or reduce the need for growing the page to contain all of the existing content. Alternatively, the empty space may remain untouched.

Method for Shrinking a Page

Figure 6:
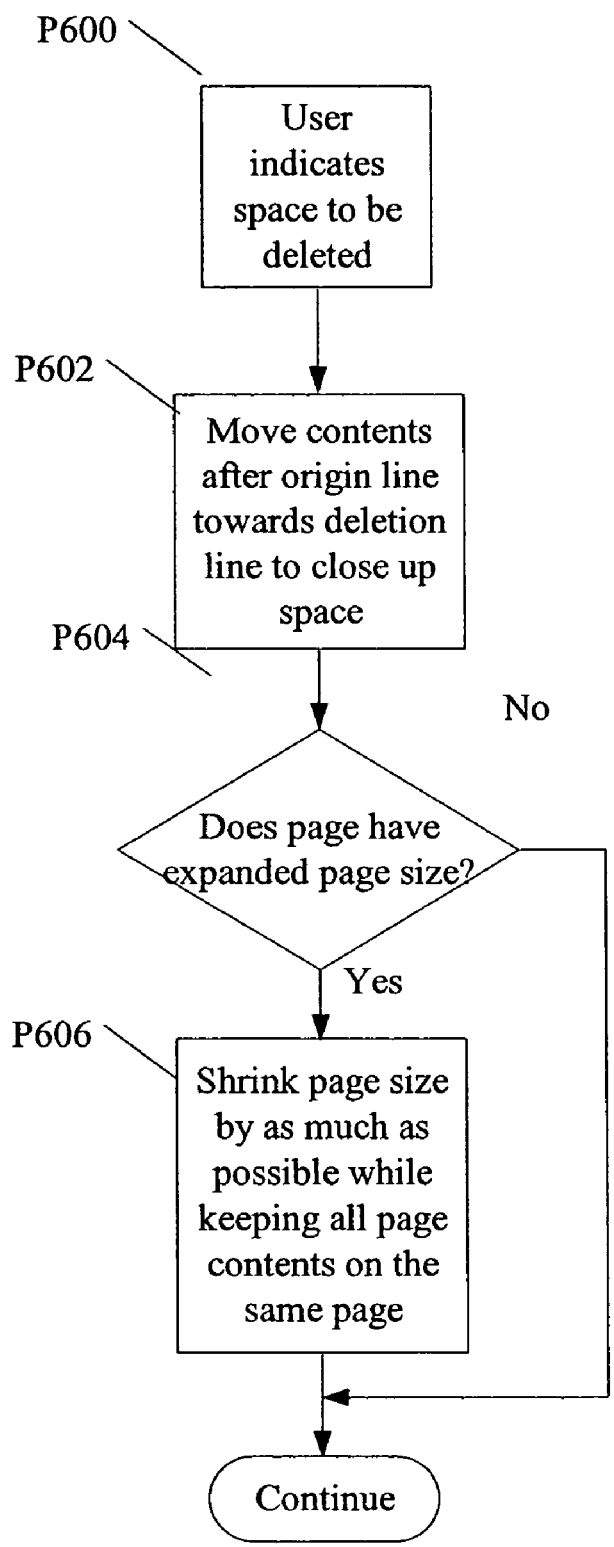
FIG. 6 is a flowchart for explaining processing that occurs, in an embodiment of the invention, when deleting a portion of a page of an electronic document.

FIG. 6 is a flowchart explaining the process for performing a space deletion operation according to various embodiments of the invention. Starting at P600, the user indicates that space is to be deleted. This may be done in the manner described previously with reference to FIGS. 4A-4D.

Next, at P602, any content on the opposite side of the origination line from the deletion line is moved toward the deletion line in order to close up space. At P604, a check is performed to determine whether the page was expanded previously. If the page was previously expanded, then the page size is decreased. The page size may be decreased by an amount equal to the amount of space between the origination and deletion lines, however, in some implementations; the page size may not be decreased to a size smaller than the original page size. If, at P604, it is determined that the page size is not expanded, then the page size will not be decreased. Here, the user may only close up empty space.

Figure 7:
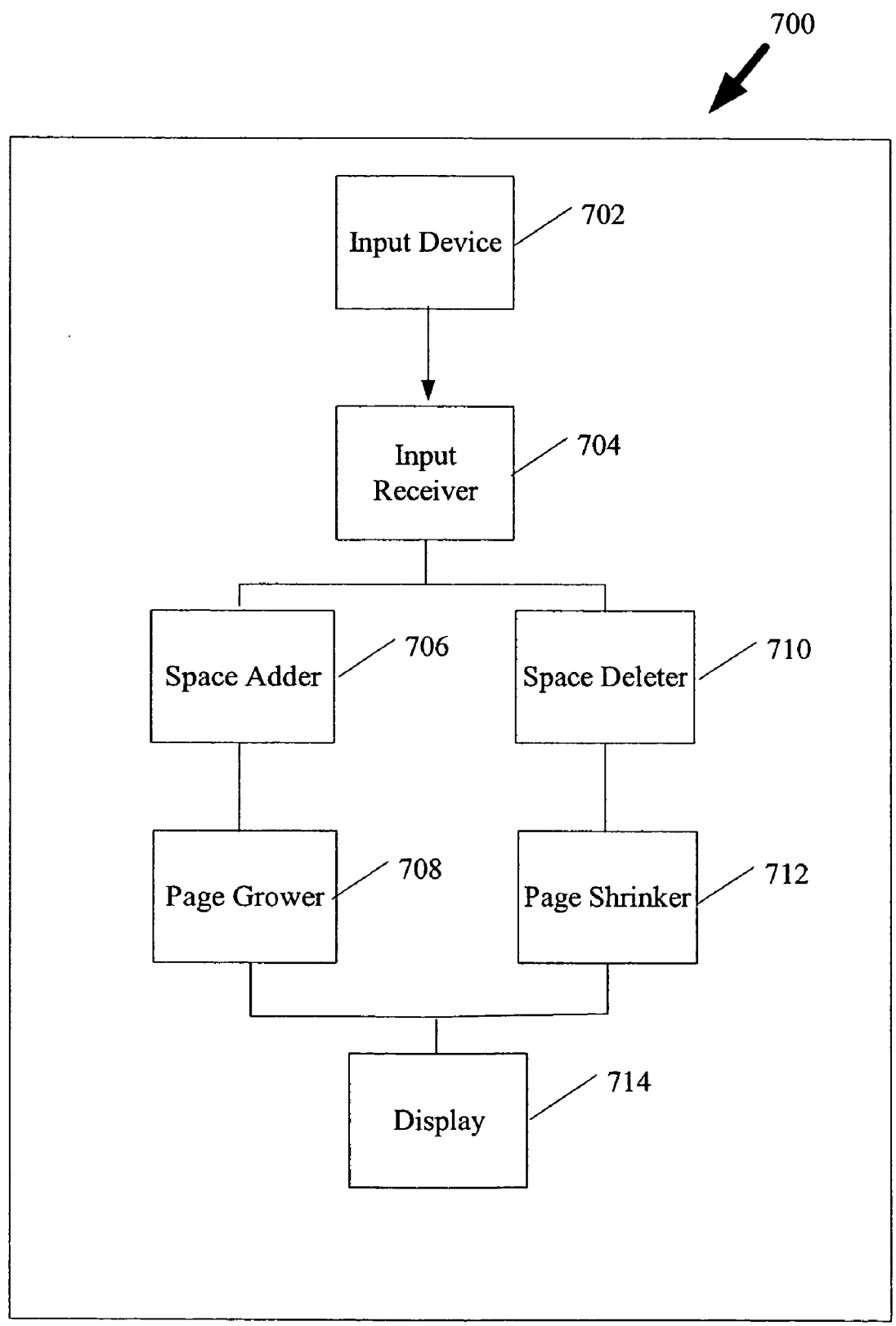
FIG. 7 illustrates a functional block diagram of an embodiment of the invention

FIG. 7 illustrates a functional block diagram of an implementation of an embodiment of the invention. As described above, the user may employ the input device 702 to indicate a position at which space is to be inserted into a page of electronic paper, and the amount of space to be inserted. A user may also employ input device 702 to indicate a position at which a portion of a page of the electronic document is to be deleted, together with the amount of the electronic page to be deleted.

The input receiver 704 receives the above input from input device 702, and provides the received input to the space adder 706 where space is to be added to a page. Space adder 706, in response to the input received by input receiver 704, moves at least some of the content of the electronic page to insert white space, when the received input indicates that white space is to be inserted. The distance that the content is moved is based on the amount of white space to be added, as indicated in the input.

Page grower 708 determines whether, as a result of content movement by space adder 706, content is larger than the existing page. If the moved content may have moved off the bottom of the page, the existing page, then page grower 708 grows the page, either in width or length, such that the original content of the page remains on the page. The grown page is then rendered on the display 714.

If the input received by the input receiver 704 is to delete space from a page, the input receiver 704 provides the received input to the space deleter 710. The space deleter 710, responsive the input received by input receiver 704, moves at least some of the content of the electronic page to delete a portion of the page. The distance that the content is moved is based on the amount of page to be deleted, as indicated by the received input.

The page shrinker 712 determines whether, as a result of content movement by space deleter 710, a page may be reduced either in length or width. If the page may be reduced in size, page shrinker 712 reduces the page. In some embodiments, of the invention the page will not be reduced to a size smaller than the original page size. The reduced page is then rendered on the display 714.

Alternative embodiments of the invention may include a cursor or the like to indicate the origination boundary, insertion boundary, or deletion boundary, instead of using dashed lines as illustrated in the accompanying figures. Also, some embodiments of the invention may grow the page only when needed to maintain content on a same page. Other embodiments may alternately grow the page whenever space is inserted into the document.

Embodiments of the invention may be implemented in hardware, software, firmware or by an application specific integrated circuit (ASIC). The firmware may be in a read only memory and the software may reside on a medium, such as read only memory, random access memory, floppy disk or compact disk.

Although the above embodiments were described using examples that include electronic ink in electronic documents, the invention is not so limited. For example, the content of an electronic page may include text (including alphabetic, numeric, and punctuation), graphic symbols, images and the like.

Aspects of the present invention have been described in terms of various embodiments thereof. Numerous other embodiments, modifications and variations within the scope and spirit of the appended claims will occur to persons of ordinary skill in the art from a review of this disclosure.

What is claimed is:

1. A system for adding space to a page of electronic paper displayed on a display, comprising:
   means for receiving a designation of a location on a page of electronic paper containing content, the page being formatted to a first page size;
   means for inserting space at the location in the page in response to receiving the designation;
   means for moving a portion of the content on the page in response to the inserting; and
   means for reformatting the page from the first page size to a second page size larger than the first page size based on the space inserted, the reformatted page at the second page size consisting of the content and the inserted space;
   wherein the page is part of a document including a plural of pages and wherein reformatting the page does not cause all of the other pages in the document to be reformatted.

2. The system of claim 1 wherein the designation includes an amount of space, the system further including means for determining that the amount of space if added to the page would cause at least some of the portion of the content of the page to not fit on the page formatted to the first page size.

3. The system of claim 2, wherein the difference between the second page size and the first page size corresponds to the minimum amount of space necessary for the at least some of the portion of the content of the page that would not fit on the page formatted to the first page size to fit on the page formatted to the second page size.

4. The system of claim 1, further comprising:
   means for determining that available space exists within the portion of the content to be moved; and
   means for removing a portion of the available space within the portion of the content to be moved,
   wherein removing the portion of the available space allows a portion of the at least some of the portion of the content of the page to fit on the page formatted to the first page size.

5. The system of claim 1, wherein the page is part of a document including plural pages, and wherein the system further comprises means for reformatting the page size of other pages to the second page size based on the space inserted.

6. The system of claim 1, wherein reformatting from the first page size to the second page size includes increasing the width of the page.

7. The system of claim 1, wherein the designation is a complex path.

8. The system of claim 1, wherein the portion of the content to be moved is determined based at least in part on a structural component on the page.

9. The system of claim 1, wherein the means for moving a portion of the content on the page includes means for modifying a structural component on the page.

10. The system of claim 1, wherein the designation is a line or lines separating content.

11. The system of claim 1, further including means for providing a scrolling control on a display displaying the page of electronic paper when the second page size of the page is too large to allow the page to be displayed on a single display screen.

12. A computer system comprising:
   a processor;
   means for displaying at least a page of electronic paper of an electronic document in which space will be inserted;
   means for inputting a designation on a page of electronic paper of an electronic document;
   means for receiving a designation of a location on a page of electronic paper containing content, the page being formatted to a first page size;
   means for inserting space at the location in the page in response to receiving the designation;
   means for moving a portion of the content on the page in response to the inserting; and
   means for reformatting the page from the first page size to a second page size larger than the first page size based on the space inserted, wherein the reformatted page at the second page size consists of the content and the inserted space, wherein the page is part of a document including plural pages and wherein reformatting the page does not cause all of the other pages in the document to be reformatted.

13. The computer system of claim 12 wherein the designation includes an amount of space, and wherein the computer system further comprises means for determining that the amount of space if added to the page would cause at least some of the portion of the content of the page to not fit on the page formatted to the first page size.

14. The computer system of claim 13, wherein the difference between the second page size and the first page size corresponds to the minimum amount of space necessary for the at least some of the portion of the content of the page that would not fit on the page formatted to the first page size to fit on the page formatted to the second page size.

15. The computer system of claim 12 further comprising:
   means for determining that available space exists within the portion of the content to be moved; and
   means for removing a portion of the available space within the portion of the content to be moved,
   wherein removing the portion of the available space allows a portion of the at least some of the portion of the content of the page to fit on the page formatted to the first page size.

16. The computer system of claim 12, wherein the page is part of a document including plural pages, and wherein the computer system further comprises means for reformatting the page size of other pages to the second page size based on the space inserted.

17. The computer system of claim 12, wherein reformatting from the first page size to the second page size includes increasing the width of the page.

18. The computer system of claim 12, wherein the means for moving a portion of the content of the page includes means for modifying a structural component on the page.

19. The computer system of claim 12, wherein the designation is a line or lines separating content.

20. The computer system of claim 12, further including means for providing a scrolling control on a display displaying the page of electronic paper when the second page size of the page is too large to allow the page to be displayed on a single display screen.

* * * * *